(12) United States Patent
Park et al.

(10) Patent No.: US 8,980,188 B2
(45) Date of Patent: Mar. 17, 2015

(54) REFRIGERATOR

(75) Inventors: Eunyoung Park, Changwon-si (KR);
Myungryul Lee, Changwon-si (KR);
Deulre Min, Changwon-si (KR);
Seunghwan Oh, Changwon-si (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 13/192,748

(22) Filed: Jul. 28, 2011

(65) Prior Publication Data

US 2012/0025104 A1    Feb. 2, 2012

(30) Foreign Application Priority Data

Jul. 29, 2010  (KR) .......................... 10-2010-0073249

(51) Int. Cl.
*B01J 19/08* (2006.01)
*A23L 3/28* (2006.01)
*A23L 3/36* (2006.01)
*F25D 17/04* (2006.01)

(52) U.S. Cl.
CPC ... *A23L 3/28* (2013.01); *A23L 3/36* (2013.01); *F25D 17/042* (2013.01); *F25D 2317/0417* (2013.01)

USPC ........ 422/186; 422/186.3; 422/105; 422/187; 250/492.1; 62/264; 62/78

(58) Field of Classification Search
CPC ........... A23L 3/28; A23L 3/36; F25D 17/042; F25D 2317/0417
USPC ............ 422/186, 186.3, 105, 187; 250/492.1; 62/264, 78
See application file for complete search history.

(56) References Cited

U.S. PATENT DOCUMENTS

| 2005/0023483 A1* | 2/2005 | Fenc ......................... 250/455.11 |
| 2008/0168790 A1* | 7/2008 | Hurlebaus et al. .............. 62/331 |
| 2010/0236278 A1* | 9/2010 | Eom et al. ....................... 62/449 |

* cited by examiner

*Primary Examiner* — Xiuyu Tai
(74) *Attorney, Agent, or Firm* — Ked & Associates, LLP (57) ABSTRACT

A refrigerator is provided. The refrigerator includes a case having at least one storage compartment for low temperature storage, a lighting source arranged in the at least one storage compartment to generate a sanitation wavelength, a location controller configured to control a location of the lighting source, and a controller configured to control operation of the location controller.

9 Claims, 6 Drawing Sheets

REFRIGERATOR

CROSS REFERENCE TO RELATED APPLICATION

This application claims the benefit of the Patent Korean Application No. 10-2010-0073249, filed on Jul. 29, 2010, which is hereby incorporated by reference as if fully set forth herein.

BACKGROUND OF THE DISCLOSURE

1. Field of the Disclosure

The present invention relates to a refrigerator which can sanitize foods stored in a storage compartment effectively, with storing foods in a relatively low temperature, and which can keep the storage compartment clean.

2. Discussion of the Related Art

In general, a refrigerator is an electric appliance which enables low temperature storage for foods to maintain freshness of various foods for a long time. The refrigerator controls a state of cold air to freeze or refrigerate the stored foods based on states of the foods.

The cold air supplied to the inside of such the refrigerator is generated by heat exchange with refrigerant. While a cycle composed of compression, condensation, expansion and evaporation is performed repeatedly, the cold air is supplied to the inside of the refrigerator constantly. The supplied refrigerant is transported to the inside of the refrigerator uniformly by convection, to store the foods put in the refrigerator at a desired temperature.

The refrigerator may be categorized, based on a structure of freezer and refrigerator compartments formed therein, into a traditional top freezer type refrigerator, a side by side type refrigerator and a bottom freezer type refrigerator.

The traditional top freezer type refrigerator includes a freezer compartment located at a top and a refrigerator compartment located at a bottom. The side by side type refrigerator includes freezer and refrigerator compartments arranged side by side.

The bottom freezer type refrigerator has been popular in North America and Europe recently and it includes a freezer compartment located at a top, with a larger capacity, and a refrigerator compartment located at a bottom.

In the meanwhile, the refrigerator includes a case having at least one storage compartment provided therein for the low storage and a door rotatably coupled to the case to open and close the storage compartment selectively.

The storage compartment of the refrigerator is typically partitioned into the freezer compartment and the refrigerator compartment. In a rear area of such the storage compartment may be provided an evaporator which generated cold air by heat-exchanging between refrigerant and internal air of the storage compartment and a fan which blows the internal air into the evaporator to blow the heat-exchanged cold air to the storage compartment.

Recently, various functions are added to the refrigerator to make a user use it conveniently. To realize the functions there may be provided a home bar capable of receiving or keeping a predetermined amount of foods or food containers in the door or a plurality of baskets located in a rear surface of the door.

Not only vegetables and fruits but also meats, fish and various food materials and cooked foods can be stored in such the refrigerator. Unless the storage compartment is cleaned periodically, unpleasant smell might be generated in the various foods stored in the storage compartment and the refrigerator might be full of the unpleasant smell. Also, fungus, bacteria and viruses might reproduce quickly to deteriorate sanitation and to give the user an unpleasant feeling.

Bacteria generated in one of the foods spread to the other foods or they are moving in the refrigerator along the circulation of the cold air. Because of that, the sanitary condition inside the refrigerator might be poor disadvantageously.

SUMMARY OF THE DISCLOSURE

An object of the present invention is to provide a refrigerator which can sanitize foods stored in a storage compartment effectively and which can maintain the storage compartment clean.

Another object of the present invention is to provide a refrigerator which can sanitize a broad storage compartment uniformly by using the relatively small number of the lighting sources.

A further object of the present invention is to provide a refrigerator which can sanitize internal air and an inner circumferential of the storage compartment together with the foods stored in the storage compartment.

A still further object of the present invention is to provide a refrigerator which can perform selective sanitation based on introduction of the foods or temperature change inside the storage compartment to reduce power consumption.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a refrigerator includes a case comprising at least one storage compartment for low temperature storage; a lighting source arranged in the storage compartment, to generate a sanitation wavelength; a location control part configured to control a location of the lighting source; and a control part configured to control operation of the location control part.

Especially, the lighting source may be an UV lighting source which generates an UV wavelength or an AOP lighting source which generates an ozone creation wavelength together with the UV wavelength.

In the meanwhile, the location control part may include a motor connected with the control part; a driving rotor rotated by the motor and a driven rotor arranged at a proper distance from the driving rotor; and a belt wound around the driving and driven rotors. The lighting source may be fixed to the belt.

The driving rotor and the driven rotor may be rollers or pulleys 5.

At this time, the location control part may include a moving block configured to movably mount the lighting source thereto along a first direction; a rail part configured to mount the moving block thereto along a second direction which is different from the first direction; and a cover mounted to a front of the moving block, the cover comprising a slot formed therein to guide a moving passage of the lighting source, and the lighting source is installed in the moving block.

The rail part may include a motor connected with the control part; a driving rotor rotated by the motor and a driven rotor arranged at a proper distance from the driving rotor; and a belt wound around the driving and driven rotors, and the moving block may be fixed to the belt.

In this case, the slot may be formed in an "S" shape.

In the meanwhile, the first direction may be a horizontal direction and the second direction may be a vertical direction.

Especially, the location control part may include a supporting member configured to mount the lighting source thereto; a ball joint configured to rotatably secure the supporting member; and a motor configured to rotate the supporting member.

The supporting member may be formed in a spherical shape and the lighting source is attached to the supporting member.

At this time, a groove recessed toward a center of the supporting member may be formed in the supporting member, and a shaft inserted in the groove may be provided in the motor.

A male gear may be formed in an end of the shaft and a female gear engaging with the male gear may be formed in an end of the groove.

The lighting source may be installed at a location which is slope a predetermined angle from a center of the supporting member.

Here, the lighting source may generate a sanitation wavelength along a direction which is slope a predetermined angle from the center of the supporting member.

In the meanwhile, the lighting source may be movably mounted along an inner circumferential surface of the storage compartment.

In another aspect of the present invention, a refrigerator includes a case comprising at least one storage compartment for low temperature storage; a lighting source arranged in the storage compartment, to generate a sanitation wavelength; and a location control part configured to control a location of the lighting source.

Therefore, according to the refrigerator according to at least one embodiment of the present invention as mentioned above, the foods stored in the storage compartment may be sanitized effectively and the storage compartment may be maintained clean.

Furthermore, according to the refrigerator according to at least one embodiment of the present invention, the broad storage compartment may be sanitized uniformly by the relatively small number of the lighting sources.

A still further, according to the refrigerator according to at least one embodiment of the present invention, internal air and the inner circumferential of the storage compartment may be sanitized together with the foods stored in the storage compartment.

A still further, according to the refrigerator according to at least one embodiment of the present invention, selective sanitation is performed based on the introduction of the foods or the temperature change inside the storage compartment. As a result, power consumption may be reduced It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

As follows, a refrigerator according to an embodiment of the present invention will be described in detail in reference to the accompanying drawings. The embodiments of the present invention shown in the accompanying drawings and described by the drawings are only exemplary and technical spirits of the present invention and its main operation are not limited by such embodiments.

In addition, reference will now be made in detail to the specific embodiments of the present invention, examples of which are illustrated in the accompanying drawings. Wherever possible, the same reference numbers will be used throughout the drawings to refer to the same or like parts.

It will be understood that expressions including ordinal number such as "first" and "second" are used to refer to various elements. The elements are not limited to the ordinal numbers and the expressions are used only for distinguish one element from the others.

Figure 1:
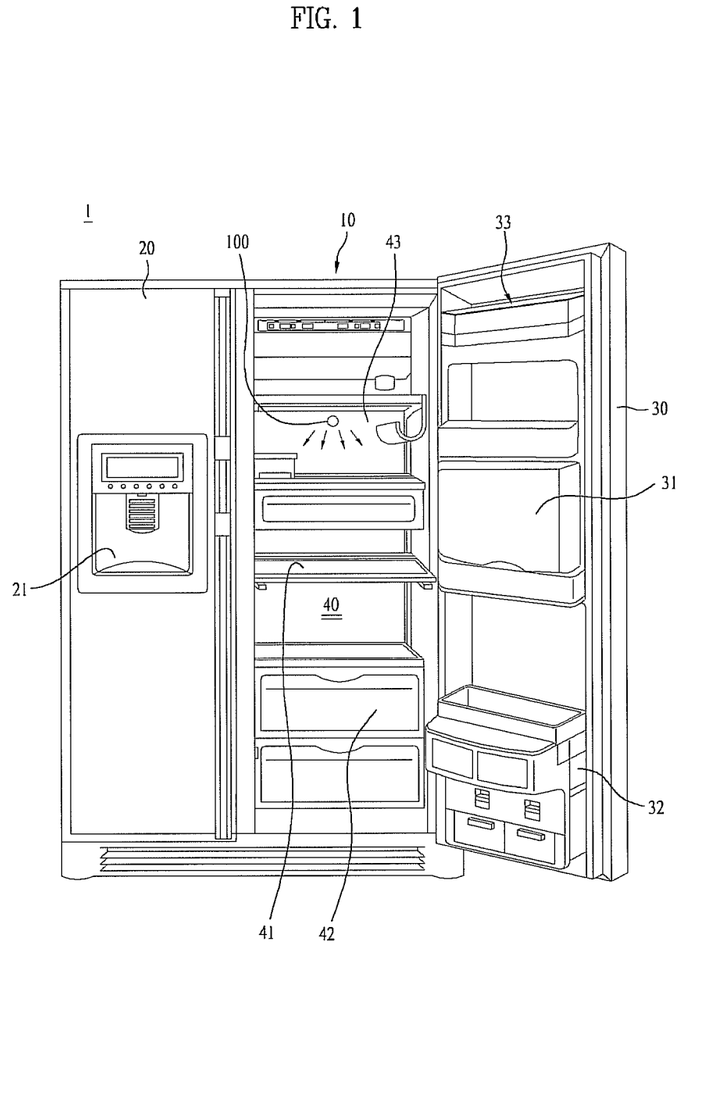
FIG. 1 is a perspective view illustrating a partially open state of a door provided in a refrigerator according to an embodiment of the present invention.

FIG. 1 is a perspective view illustrating a partially open state of a door provided in a refrigerator 1 according to an embodiment of the present invention.

The refrigerator 1 according to the embodiment of the present invention may be applicable various types of refrigerators such as a traditional top freezer type refrigerator, a side by side type refrigerator or a bottom freezer type refrigerator. To explain the present invention conveniently, the side by side type refrigerator used broadly in recent is embodied which includes freezer and refrigerator compartments located side by side, with being selectively closed by doors provided respectively.

The refrigerator 1 according to the embodiment of the present invention includes a case 10 having at least one storage compartment 40 for low temperature storage, at least one door 20 and 30 rotatably coupled to the case 10 to open and close the storage compartment 40 selectively, a lighting source 100 arranged in the storage compartment to generate a sanitary wavelength, a location control part (not shown) configured to control the location of the lighting source, and a control part (not shown) configured to control an operation of the location control part.

Especially, it is preferable that the location control part is less exposed to a user for the interior beauty of the storage compartment 40. As a result, it is preferable that the location control part is exposed enough for the user not to recognize in the storage compartment 40 and that specific elements used to drive the location control part is arranged in an outer space of the storage compartment 40. It is more preferable that the location control part is provided in a predetermined space between an outer case and an inner case.

In reference to FIG. 1, the refrigerator 1 according to the embodiment of the present invention includes the case 10 which provides a predetermined space where foods and food containers can be stored at a low temperature and it defines an exterior appearance of the refrigerator 1. The case 10 forms an approximately cube-shaped profile, with an open front to receive foods and foods containers.

The case 10 of the refrigerator 1 includes an outer case (not shown) and at least one inner case arranged in the outer case, with a storage compartment for freezing or refrigerating foods.

The door 20 and 30 is rotatably coupled to the open front of the case 10 to open and close the open front of the case 10 selectively. FIG. 1 illustrates the side by side type refrigerator which includes a first door 20 and a second door 30 coupled to the case 10 to open and close a left storage compartment and a right storage compartment 40, respectively.

In recent, various functions are added to the refrigerator to make a user use it conveniently. To realize the functions, a home bar 31 and a dispenser 21 may be further provided in the doors 20 and 30. The user may keep and store a predetermined amount of food or food containers in the home bar 31 and he or she may get purified water or ice from the dispenser 21 outside.

At least one basket 33 may be provided in a rear surface of the door 30.

In case of the side by side type refrigerator 1, an internal room of the case 10 may be partitioned off into a left room and a right room. Commonly, the left room is employed as a freezer compartment (not shown) storing foods and food containers below zero temperatures and the right room is employed as a refrigerator compartment 40 storing foods and food containers above zero temperatures to preserve the foods fresh.

A plurality of shelves 41 are provided in the freezer compartment and refrigerator compartment 40 and the foods and the food containers are placed on the plurality of the shelves 41. Because of the shelves 41, the internal rooms of the freezer and refrigerator compartments are partitioned off into a plurality of layers as a plurality of storage rooms. Also, a drawer 42 may be further provided in the freezer compartment and the refrigerator compartment 40 to receive food items such as vegetables or fruits.

In the refrigerator are stored meats, fish, various food materials and cooked foods as well as vegetables and fruits. The plurality of the storage rooms defined by the shelves and the drawer may be provided in the case 10, and separate storage for each of food items may be possible.

For example, one of the drawers 42 provided in the refrigerator compartment may be used to store vegetables and/or fruits and another one of the drawers 42 may be used to store meats or fish. A containing box 32 provided in the rear surface of the door 30 may be used to store grains such as rice, beans or adzuki beans.

The lighting source 100 may be an ultraviolet (UV) lighting source 100 which irradiates a light having an UV wavelength. The UV lighting source genetically modifies microorganisms for sanitation. Such the UV lighting source 100 includes a lamp or light emitting diode (LED).

Alternatively, the lighting source 100 may be an advanced oxidation process (AOP) lighting source which generates an UV creation wavelength and an ozone creation wavelength.

Here, the AOP type refers to technology which performs oxidation treatment by creating OH radical as an intermediate product. When 253.7 nm of the UV wavelength and 184.9 nm of the ozone creation wavelength are generated in an electric discharge lamp simultaneously, the wavelengths are combined with oxygen ($O_2$) contained in the air and a large amount of OH radical created in a photodegradation process is oxidation-treated.

At least one lighting source 100 may be provided in the freezer and/or refrigerator compartment, and the at least one lighting source 100 may be provided in the drawer or the containing box 32 which is the storage room for special foods.

Figure 2:
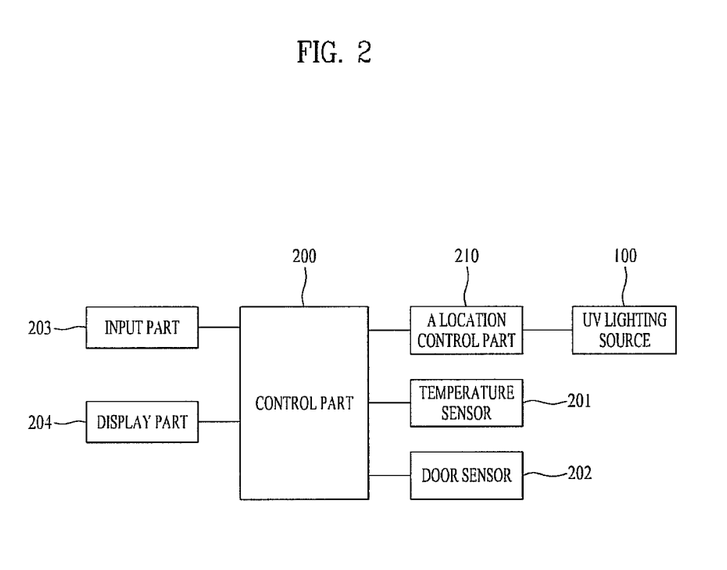
FIG. 2 is a diagram illustrating key parts of a control part composing the refrigerator according to the embodiment of the present invention.

FIG. 2 is a diagram illustrating key parts of the control part 200 composing the refrigerator according to the embodiment of the present invention.

In reference to FIGS. 1 and 2, the refrigerator 1 according to the embodiment of the present invention includes the control part 200 to control the operation of the lighting source 100. The control part 200 may be a central controller (not shown) configured to control an overall operation of the refrigerator or a local controller configured to control only the operation of the lighting source 100.

The control part 200 may include an input part 203 configured to receive an input control signal for ON/OFF, luminescence consistence, a luminescence intensity, for example, strong, middle and weak and a luminescence period, and a display part 204 configured to display a state of the storage compartment.

Here, the input part 203 may include a freezer compartment temperature control part, a refrigerator compartment temperature control part and a special storage compartment temperature control part. It may further include an operation mode selection part and a lock-setting/unlocking input part.

Information on the state of the storage compartment may include at least one of an operation mode, an operation temperature, door openness, lock-setting and abnormal state information.

Specifically, the display part 204 may display an operation temperature of a storage compartment for special foods requiring special treatment, for example, the drawer and the containing box as well as operation temperatures of the freezer and refrigerator compartments.

In addition, the display part 204 may be a liquid crystal display and it may be configured of a plurality of light emitting diodes (LED) arranged to display numbers, letters and symbols.

The lighting source 100 may be operated based on at least one of the continuous luminescence time, the luminescence intensity (for example, strong, middle and weak) and the luminescence period which are stored in the control part 200.

Here, the continuous luminescence time, the luminescence intensity (for example, strong, middle and weak) and the luminescence period of the lighting source 100 may be pre-input by the user, and they are controlled by the control part 200 constantly. Alternatively, they may be input at a point of time when the user desires to drive the lighting source 100 and they may be controlled intermittently.

The refrigerator 1 according to this embodiment may further include a temperature sensor 201 to measure the temperature of the storage compartment.

Here, the control part 200 may control the operation of the lighting source 100 based on changes of the temperature inside the storage compartment. According to an embodiment, the lighting source 100 may be operated for a predetermined time period, if the temperature of the storage compartment is increased to be higher than a preset reference value.

The reference value may be determined experimentally, for example, 2° C.~6° C. or approximately 3° C.

The control part 200 determines that contamination of the foods stored in the storage compartment is expected, when the temperature change is measured to be higher than the reference value. The control part 200 may operate the lighting source 100 based on the determination.

The control part 200 may control the operation of the lighting source based on an open state, an open frequency or an open time of the door. For example, the control part 200 operates the lighting source 100 for a preset time period after the door is open and closed, and it may not operate the lighting source 100 until the door is opened and closed after that.

In other words, contamination of the foods stored in the storage compartment may be expected after control part may control the operation of the lighting source based on the door open state, the door open frequency or the door open time.

In the meanwhile, the present invention describes the embodiment that the operation of the UV lighting source is controlled based on the door open state or the temperature change of the storage compartment. However, it is not limited by the embodiment and the operation of the lighting source may be controlled in consideration of the door open state and the temperature change of the storage compartment.

For example, when the temperature inside the storage compartment is increased to be higher than the reference value after the door is open and closed, the lighting source 100 may be controlled to be operated for a preset time period. Until the temperature inside the storage compartment is increased to be higher than the reference value after the door is re-opened and re-closed, the lighting source 100 may be controlled not to be operated.

In case the lighting source 100 is operated constantly in the refrigerator, discoloration might occur in a plastic material (which forms an inner circumferential surface of the storage compartment and the food containers) inside the refrigerator even after the sanitation is completed and a replacement time might be accelerated.

According to the refrigerator 1 of the embodiment of the present invention, the lighting source 100 is operated only in case the contamination of the storage compartment or the contamination of the stored foods is expected. Because of that, the inner circumferential surface of the storage compartment and the food containers may be prevented from being discolored and usage of the lighting source 100 may be lengthened.

In addition, sanitation may be performed selectively when the contamination of the foods is expected, that is, based on the introduction of the foods or the temperature change inside the storage compartment. Because of that, power consumption may be reduced.

Figure 3:
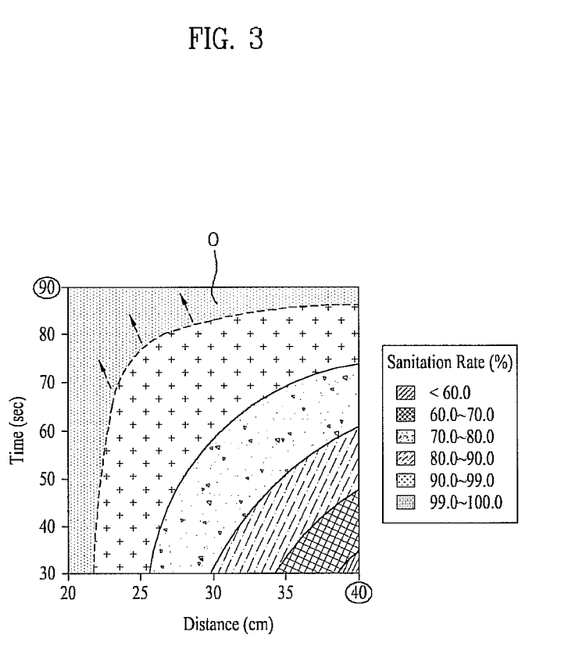
FIG. 3 is a graph to explain an operation effect of a light source provided in the refrigerator according to the embodiment of the present invention.

FIG. 3 is a graph to explain an operation effect of the UV lighting source out of the light sources provided in the refrigerator according to the embodiment of the present invention.

In reference to FIG. 3, a horizontal axis refers to a distance from the UV lighting source (6 W) and a vertical axis refers to a luminescence continuous time of the UV lighting source. Based on the result of an experiment, it is identified that a sanitation rate is getting high as the distance from the UV lighting source is getting smaller and the luminescence continuous time is getting lengthened. Especially, it is identified that a region (O) having a sanitation rate of 99% exists. For example, when the distance from the UV lighting source is approximately 20 cm, the sanitation rate of 99% exists. Especially, it is shown that the sanitation rate of the UV lighting source is affected by the distance between the UV lighting source and a sanitary object more than by the luminescence continuous time.

As a result, it is preferable that an independent UV lighting source is installed in each of storage rooms such as the drawer 42 or the containing box 33. Here, the UV lighting source or the AOP lighting source is corresponding to a highly price part. If the lighting source is installed in each storage room to reduce the distance between the lighting source and the food containers or the foods, the manufacture cost results in increasing disadvantageously.

The refrigerator 1 according to the embodiment of the present invention may include the location control part 210 to control the location of the lighting source. As a result, a smaller number of lighting sources may be used to sanitize the storage compartment uniformly.

Figure 4:
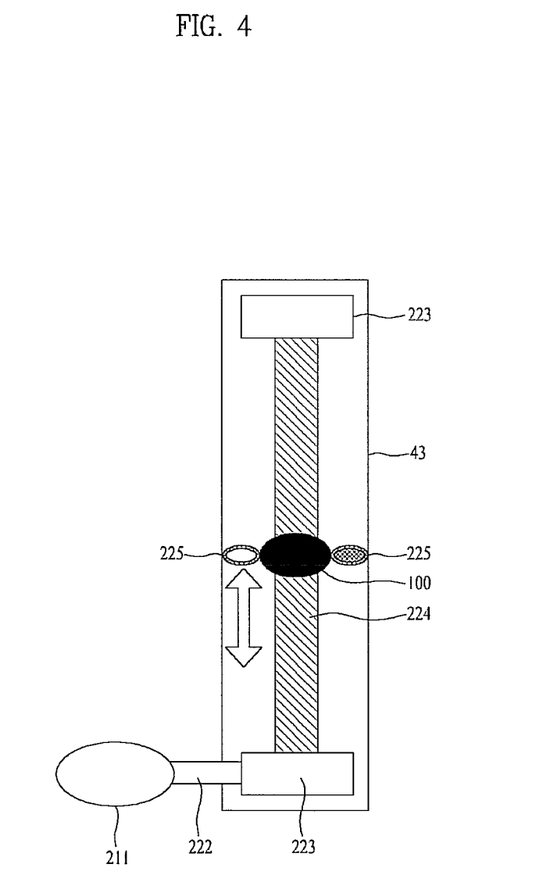
FIGS. 4 to 6 are conceptual diagrams illustrating a location control part provided in the refrigerator according to the embodiment of the present invention.
Figure 5:
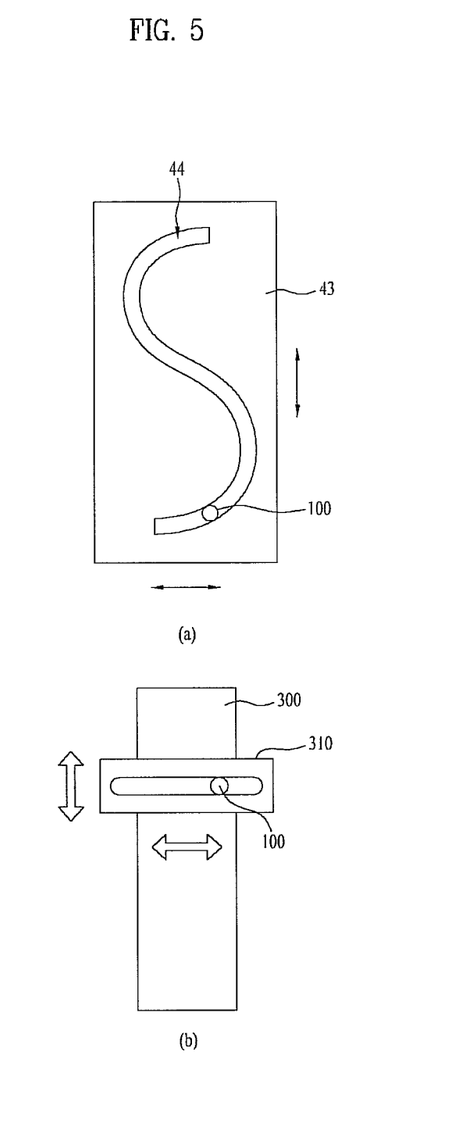
Figure 6:
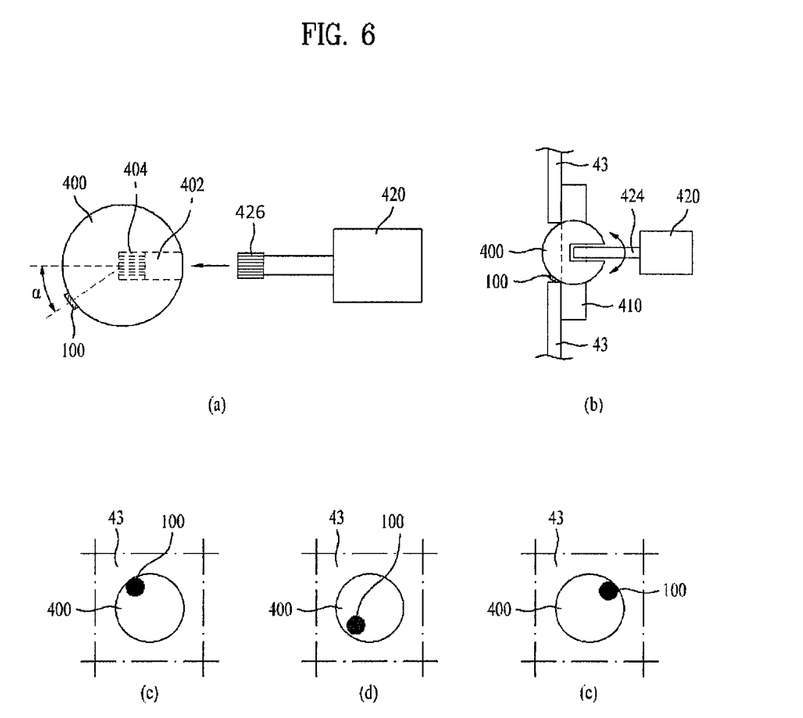

FIGS. 4 to 6 are conceptual diagrams to explain the location control part provided in the refrigerator according to the embodiment of the present invention.

In reference to FIGS. 2 and 4, the location control part 210 may include a motor 211 connected with the control part 200, a pair of rotors 223 rotated by the motor 211 and a belt 224 wound around each of the rotors. At this time, the lighting source 100 may be fixed to the belt 224.

The pair of the rotors 223 may include a driving rotor rotated by the motor and a driven rotor distant from the driving rotor. The driving rotor and the driven rotor may be rollers or pulleys. A rotational force of the driving rotor is transmitted to the driven rotor and the driven rotor is rotated together with the rotation of the driving rotor.

In addition, the location control part 210 may further include a reduction gear part 222 to reduce the velocity between the motor 211 and the driving rotor.

A numeral reference of "225" without description refers to a roller configured to guide a smooth translational motion of the lighting source.

According to this embodiment, a rotational force may be generated by the motor 211. The rotational force may be transported to the driving rotor and the driven rotor, such that the belt 224 may move vertically. As a result, the lighting source 100 installed in the belt 224 may irradiate a sanitation wavelength at various locations of the storage compartment provided in the refrigerator, with moving along the movement of the belt 224 vertically.

In reference to FIGS. 2, 4 and 5, another embodiment modified from the embodiment described above in reference to FIGS. 2 and 4 will be described. In reference to FIG. 5, the location control part 210 may include a moving block 310 where the lighting source 100 is movably mounted along a first direction, a rail part 300 movably mounted along a second direction, different from the first direction which is the moving direction of the moving block 310, and a cover 43 mounted to a front of the moving block 310, with a slot 44 formed therein to guide a moving passage of the lighting source 100. The first direction may be a horizontal direction and the second direction may be a vertical direction.

It is preferable that the lighting source 100 is arranged in the moving block 310, not in the rail part 300 in the embodiment in reference to FIG. 4. This is because horizontal and vertical direction motions can be generated simultaneously in the embodiment of FIG. 5, different from the embodiment of FIG. 4.

The cover 43 may be one of circumferential surfaces of the storage compartment 40 or it may be a panel type installed in a predetermined area of the storage compartment 40. Some of the lighting source 100 may irradiate the sanitation wavelengths to the storage compartment via the slot 44 formed in the cover 43. The user may recognize only the slot 44 and the lighting source 100 in the storage compartment 40. It is preferable that the complex structure is not exposed to the storage compartment 40.

The rail part 300 may include the motor, the pair of the rotors and the belt described above in reference to FIG. 4. According to an embodiment, the rail part 300 may include a motor connected with the control part, a driving rotor rotated by the motor, a driven rotor arranged at a proper distance from the driving rotor and a belt wound around the driven rotor. The moving block 310 may be fixed to the belt. In other words, the motion of the rail part 300 may move the lighting source 100 vertically along an upward and downward direction according to the scheme described in reference to FIG. 4. At this time, the lighting source 100 is not fixed to the belt.

In the meanwhile, the moving block 310 may be mounted to the rail part 300, with movable along a horizontal direction. Because of that, the moving block 310 may perform the horizontal direction motion 'independently' with respect to the motion of the rail part 300. The moving block 310 is formed in an annulus shape, to secure the belt of the rail part 300 surroundingly. As a result, the moving block 310 may perform a horizontally relative motion with respect to the rail part 300, regardless of the motion of the rail part 300.

The slot 44 may be formed in an "S" shape. At this time, "S" shape is similar to a Chinese character "之" which means "go", with a curvature formed in its passage.

When the slot 44 has the "S" shape, the lighting source 100 has to have a structure which can generate a horizontal motion and a vertical motion along the shape of the slot 44 simultaneously. The rail part 300 may perform the vertical direction motion which is the second direction motion by using the motor, the pair of the rotors and the belt according to the scheme described in reference to FIG. 4. In contrast, the moving block 310 may perform the horizontal direction motion which is the first direction motion along the shape of the slot 44, independent from the motion of the rail part 300.

In the meanwhile, if the lighting source 100 is inserted in a recess formed in the slot 44, the lighting source 100 is moved along the shape of the slot 44, to generate the motion of the moving block 310 naturally. In other words, the moving passage of the lighting source 100 is limited by the slot 44. The vertical direction motion of the lighting source 100 is performed by the motor and the horizontal direction motion of the lighting source 100 is performed by the slot 44.

When the motion of the rail part 300 and the motion of the moving block 310 are generated at the same time, the "S" shaped motion of the slot 44 may be realized.

In other words, the location control part can perform the translational motion along a preset direction according to the structure represented by the embodiment described in reference to FIG. 4. The location control part can perform combined translational motion in two different directions according to the structure represented by the embodiment described in reference to FIG. 5. This is a different feature between the two embodiments described in reference to FIGS. 4 and 5.

In reference to FIGS. 2 and 6, the location control part 210 may include a supporting member 400 where the lighting source 100 is mounted, a ball joint 410 configured to fasten the supporting member 400 rotatably and a motor 420 configured to rotate the supporting member 400. The motor 420 may be controlled by the control part described above.

In reference to FIGS. 6(a) and 6(b), the ball joint 410 is installed in the cover 43. The supporting member 400 is received in the ball joint 410 and the motor 420 is provided in the cover 43 to rotate the supporting member 400. The ball joint 410 may be installed in a rear surface of the cover 43. Different from FIG. 6(b), the ball joint 410 may be insertedly installed in a predetermined space between the ball joint 410 and the cover 43.

The supporting member 400 may be formed in a spherical shape and the lighting source 100 is installed on a predetermined area of the supporting member 400. The lighting source 100 irradiates sanitation wavelengths or lights forwardly.

However, the supporting member 400 is spherical-shaped and a cross sectional area of the supporting member 400 is circular. An outer circumferential surface of the supporting member 400 has a slope of $\alpha°$ forwardly. Also, the light irradiated from the lighting source 100 may have a slope of $\alpha°$. The predetermined angle of $\alpha°$ may be variable in consideration of the size of the storage compartment and the size of the space the user desires to sanitize.

Alternatively, the lighting source 100 may be installed in a center of the supporting member 400, in other words, a center of the spherical shape.

A groove 402 may be formed in a center of the supporting member 400 and a shaft extended in a longitudinal direction may be inserted in the groove 402. A female gear 404 is formed in an inside of the groove 402. It is preferable that the groove 402 is formed to correspond to an extended line passing through a center of the spherical shaped supporting member 400. Also, the female gear 404 may have a plurality of gear teeth.

The motor 420 is provided to rotate the supporting member 400 and a shaft 424 is installed in the motor 420 to transport the rotational force generated in the motor 420 to the supporting member 400. A male gear 426 having a plurality of gear teeth may be formed at an end of the shaft 424.

The shaft 424 is inserted in the groove 402. The female gear 404 and the male gear 426 are arranged, with engaging with each other. As a result, the rotational force generated in the motor 420 is transported to the supporting member 400 via the male gear 426 and the female gear 404, to rotate the supporting member 400.

The ball joint 410 receives the supporting member 400. Here, the supporting member 400 has the spherical shape and a spherical shaped receiving groove may be formed in the ball joint 410. However, the thickness of the ball joint 410 is smaller than the thickness of the supporting member 400 as shown in FIG. 6(b), the ball joint 410 may receive the supporting member 400 partially to secure the supporting member 400.

In reference to FIGS. 6(c), 6(d) and 6(e), the lighting source 100 irradiating lights will be described.

Once an electric power is applied to the motor 420, a rotational force may be generated in the motor 420. The velocity of the rotational force generated at this time may be reduced by the reduction gear arranged in the motor 420. In contrast, the motor 420 may generate constant rotation or it may generate intermittent rotation by applying the intermittently electric power or by using an auxiliary driving circuit or a physical configuration. Also, the motor 420 may provide various types of rotations such as rotation in a predetermined direction and in a reverse direction.

The shaft 424 is rotated along the rotation of the motor 420 and the male gear 426 is rotated at the same time. If then, the rotational force may be delivered to the female gear 404 engaging with the male gear 426.

The female gear 404 is rotated and the supporting member 400 is rotated at the same time. Because of that, the lighting source 100 installed in the supporting member 400 may be rotated. While it is rotated with drawing a circular, the lighting source 100 may irradiate lights at various locations.

Especially, the light irradiated from the lighting source 100 may have a slope of a' with respect to a line passing the center of the supporting member 400. As a result, the light irradiated from the lighting source 100 may be irradiated into the refrigerator, with drawing a locus of a circle which is larger than a radius of a circle made by the rotation of the lighting source 100. This is because the lighting source 100 is slope a predetermined angle of $\alpha°$ with respect to the center of the supporting member 400. As the irradiated light is getting farther from the lighting source 100, it is getting farther from the center of the supporting member 400.

As a result, this embodiment has an advantage that a relatively broader storage area of the storage compartment can be sanitized uniformly by using the lighting source 100, compared with the other embodiment.

Therefore, according to the refrigerator according to at least one embodiment of the present invention as mentioned above, the foods stored in the storage compartment may be sanitized effectively and the storage compartment may be maintained clean.

Furthermore, according to the refrigerator according to at least one embodiment of the present invention, the broad storage compartment may be sanitized uniformly by the relatively small number of the lighting sources.

A still further, according to the refrigerator according to at least one embodiment of the present invention, internal air and the inner circumferential of the storage compartment may be sanitized together with the foods stored in the storage compartment.

A still further, according to the refrigerator according to at least one embodiment of the present invention, selective sanitation is performed based on the introduction of the foods or the temperature change inside the storage compartment. As a result, power consumption may be reduced It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A refrigerator, comprising:
   a case comprising at least one storage compartment for low temperature storage;
   a lighting source arranged in the at least one storage compartment, to generate a sanitation wavelength;
   a location controller configured to control a location of the lighting source; and
   a controller configured to control operation of the location controller, wherein the controller operates the lighting source for a predetermined period of time after a door is opened and closed, wherein the location controller comprises:
   a moving block configured to receive the lighting source moveably mounted thereto, the lighting source being moveable on the moving block along a first direction;
   a rail configured to receive the moving block moveably mounted thereto, the lighting source being moveable on the rail along a second direction, which is different from the first direction; and
   a cover mounted to a front of the moving block, the cover comprising a slot formed therein to guide movement of the lighting source, wherein the lighting source is installed in the moving block, wherein the rail comprises:
   a motor connected with the controller;
   a driving rotor rotated by the motor and a driven rotor arranged at a predetermined distance from the driving rotor; and
   a belt wound around the driving and driven rotors, wherein the moving block is fixed to the belt, wherein the slot is formed in an "S" shape, and wherein the first direction is a horizontal direction and the second direction is a vertical direction.

2. The refrigerator of claim 1, wherein the lighting source is an UV lighting source that generates an UV wavelength or an AOP lighting source that generates an ozone creation wavelength together with the UV wavelength.

3. The refrigerator of claim 1, wherein the lighting source is movably mounted along an inner circumferential surface of the storage compartment.

4. The refrigerator of claim 1, wherein the controller determines that contamination of foods stored in the at least one storage compartment is expected when a temperature change measured is higher than a predetermined value.

5. The refrigerator of claim 4, wherein the controller operates the lighting source when the contamination of the foods stored in the at least one storage compartment is expected.

6. The refrigerator of claim 1, wherein the controller operates the lighting source based on one of an open state, an open frequency, or an open time of the door.

7. The refrigerator of claim 1, wherein when a temperature inside the at least one storage compartment increases higher than a predetermined value after the door is opened and closed, the controller operates the lighting source for the predetermined period of time.

8. The refrigerator of claim 7, wherein until the temperature inside the at least one storage compartment increases higher than the predetermined value after the door is re-open and re-closed, the controller does not operate the lighting source.

9. The refrigerator of claim 1, wherein the lighting source is arranged in the moving block that generates a horizontal motion and a vertical motion simultaneously.

* * * * *